(12) United States Patent
Liang et al.

(10) Patent No.: US 10,078,233 B2
(45) Date of Patent: Sep. 18, 2018

(54) OPTICAL WAVEGUIDE RESONATORS

(71) Applicant: HEWLETT PACKARD ENTERPRISE DEVELOPMENT LP, Houston, TX (US)

(72) Inventors: Di Liang, Santa Barbara, CA (US); Geza Kurczveil, Palo Alto, CA (US); Marco Fiorentino, Mountain View, CA (US); Raymond G. Beausoleil, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/328,903

(22) PCT Filed: Jul. 30, 2014

(86) PCT No.: PCT/US2014/048818
§ 371 (c)(1),
(2) Date: Jan. 24, 2017

(87) PCT Pub. No.: WO2016/018285
PCT Pub. Date: Feb. 4, 2016

(65) Prior Publication Data
US 2017/0212368 A1    Jul. 27, 2017

(51) Int. Cl.
*G02F 1/035*    (2006.01)
*G02F 1/025*    (2006.01)
(Continued)

(52) U.S. Cl.
CPC ......... *G02F 1/025* (2013.01); *G02B 6/29338* (2013.01); *G02F 2001/0152* (2013.01); *G02F 2203/15* (2013.01)

(58) Field of Classification Search
CPC ......... G02B 6/29338; G02F 2001/0152; G02F 2203/15
See application file for complete search history.

(56) References Cited

U.S. PATENT DOCUMENTS 6,492,283 B2    12/2002    Raaijmakers
6,493,476 B2    12/2002    Bendett
(Continued)

FOREIGN PATENT DOCUMENTS

WO    WO2013066318 A1    5/2013
WO    WO2013165376 A1    11/2013
(Continued)

OTHER PUBLICATIONS

Office Action, dated Apr. 14, 2017, U.S. Appl. No. 15/205,789, 26 pages.
(Continued)

*Primary Examiner* — Sung Pak
(74) *Attorney, Agent, or Firm* — McDermott Will & Emery

(57) ABSTRACT

An example device in accordance with an aspect of the present disclosure includes a first semiconductor layer disposed on a substrate, a dielectric layer disposed between the first semiconductor layer and a second semiconductor layer dissimilar from the first semiconductor layer. A capacitor is formed of at least a portion of the first semiconductor layer, the dielectric layer, and the second semiconductor layer, and is to be included in an optical waveguide resonator.

15 Claims, 10 Drawing Sheets

(51) Int. Cl.
*G02B 6/293* (2006.01)
*G02F 1/015* (2006.01)

(56) References Cited

U.S. PATENT DOCUMENTS

| | | | |
|---|---|---|---|
| 6,585,424 B2 | 7/2003 | Chason | |
| 6,706,581 B1 | 3/2004 | Hou et al. | |
| 6,902,987 B1 | 6/2005 | Tong | |
| 7,231,123 B2 | 6/2007 | Sugita | |
| 7,817,881 B2 | 10/2010 | Li | |
| 7,838,314 B2 | 11/2010 | Choi | |
| 7,949,210 B2 | 5/2011 | Durfee et al. | |
| 8,078,018 B2 | 12/2011 | Mouli | |
| 8,372,673 B2 | 2/2013 | Lee et al. | |
| 8,664,087 B2 | 3/2014 | Chang et al. | |
| 8,716,852 B2 | 5/2014 | Shu et al. | |
| 9,018,675 B2 | 4/2015 | Bedell et al. | |
| 9,240,406 B2 * | 1/2016 | Feng | H01L 29/66181 |
| 9,640,531 B1 * | 5/2017 | Or-Bach | H01L 27/0688 |
| 2002/0168837 A1 | 11/2002 | Hsu et al. | |
| 2004/0081386 A1 * | 4/2004 | Morse | G02B 6/12007 385/15 |
| 2006/0035450 A1 | 2/2006 | Frank et al. | |
| 2009/0194152 A1 | 8/2009 | Liu et al. | |
| 2009/0263076 A1 * | 10/2009 | Mathai | G02B 6/12007 385/14 |
| 2009/0302415 A1 * | 12/2009 | Mueller | B81C 1/00246 257/508 |
| 2010/0215309 A1 | 8/2010 | Shubin et al. | |
| 2011/0073989 A1 | 3/2011 | Rong et al. | |
| 2011/0293216 A1 | 12/2011 | Lipson et al. | |
| 2012/0002285 A1 | 1/2012 | Matsuda | |
| 2012/0119258 A1 | 5/2012 | Liang | |
| 2013/0009321 A1 | 1/2013 | Kagawa | |
| 2013/0155484 A1 | 6/2013 | Sweatlock | |
| 2015/0055910 A1 * | 2/2015 | Liang | G02F 1/025 385/2 |

FOREIGN PATENT DOCUMENTS

| | | |
|---|---|---|
| WO | WO2014021781 A1 | 2/2014 |
| WO | PCTUS2015013605 | 1/2016 |
| WO | WO2016018285 A1 | 2/2016 |

OTHER PUBLICATIONS

Office Action, dated Nov. 8, 2016, U.S. Appl. No. 15/141,948, 20 pages.

Ansheng Liu et al., "A High-Speed Silicon Optical Modulator Based on a Metal-Oxide-Semiconductor Capacitor," Nature 427, Feb. 12, 2004, Nature Publishing Group, pp. 615-618.

Fan et al, "Impact of Interfacial Layer and Transition Region on Gate Current Performance for High-K Gate Dielectric Stack: Its Tradeoff With Gate Capacitance," (Research Paper) Electron Devices IEEE Transactions on 50.2 Mar. 2003 pp. 433-439.

Jeong, Y-K. et al., "High Quality High-k MIM Capacitor by Ta2O5/HfO2/Ta2O5 Multi-layered Dielectric and NH3 Plasma Interface Treatments for Mixed-Signal/RF Applications" (Research Paper) VLSI Technology Digest of Technical Paper 2004.

Kissinger et al., "Void-free silicon-wafer-bond strengthening in the 200-400° C. range", Sens. Actuators A 36, 1993, pp. 149-156.

Li, J., "Wafer Scale Flexible Interconnect Fabrication for Heterogeneous Integration," (Doctoral Dissertation), TU Delft, Delft University of Technology, Oct. 26, 2015, 94 pages.

Liang et al, "Highly efficient vertical outgassing channels for low-temperature InP-to-silicon direct wafer bonding on the silicon-on-insulator substrate", J. Vac. Sci. Technol B 26 (4) American Vacuum Society 2008 pp. 1560-1568.

Martijn J.R. Heck et al., "Hybrid Silicon Photonics for Optical Interconnects," IEEE Journal of Selected Topics in Quantum Electronics, Aug. 13, 2010, pp. 1-14.

Xiaonan Chen et al., "Active Transmission Control Based on Photonic-Crystal MOS Capacitor," Photonic Crystal Materials and Devices VI, Jan. 23, 2007, Proc. of SPIE vol. 6480 pp. 1-9.

* cited by examiner

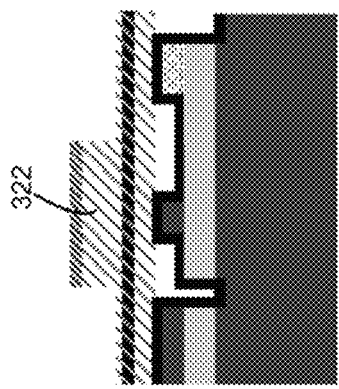
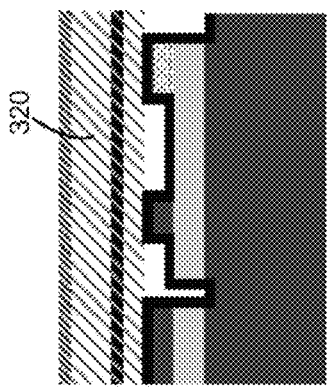
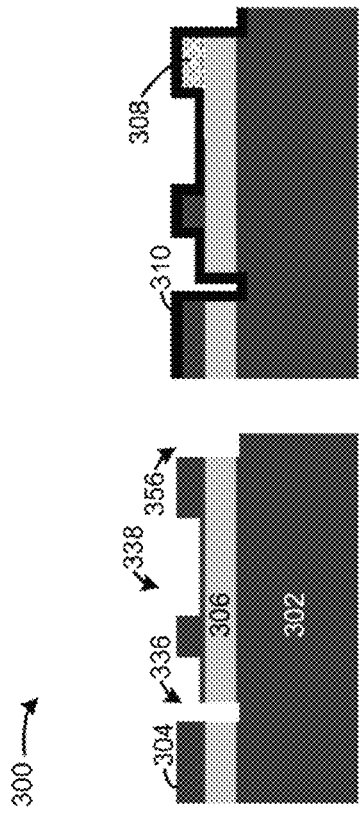

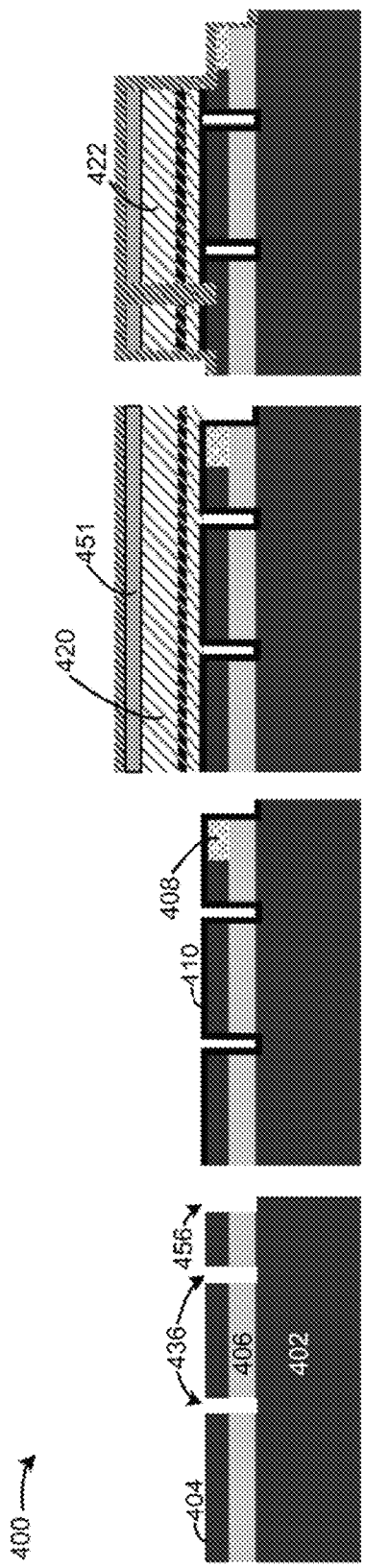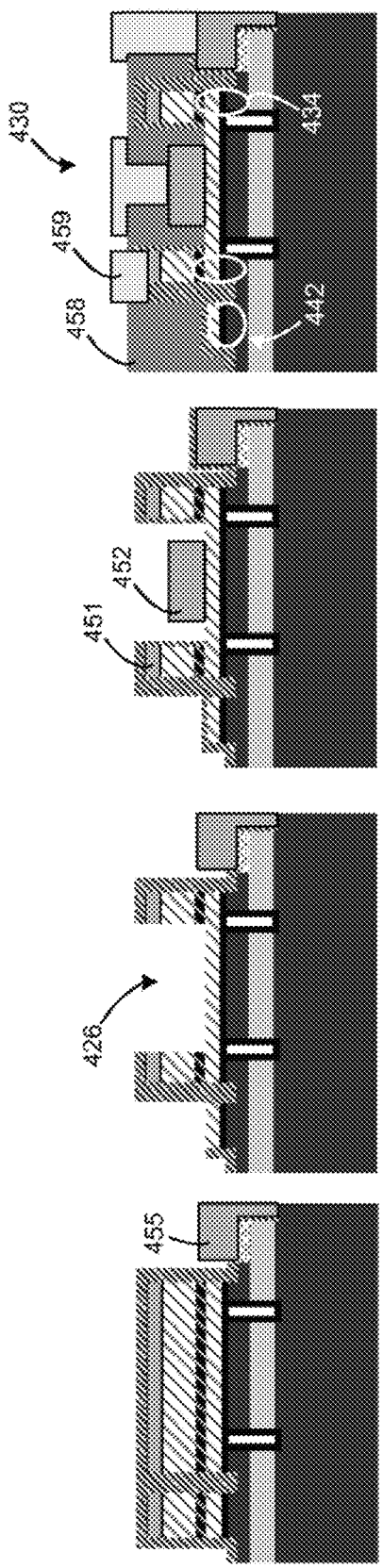

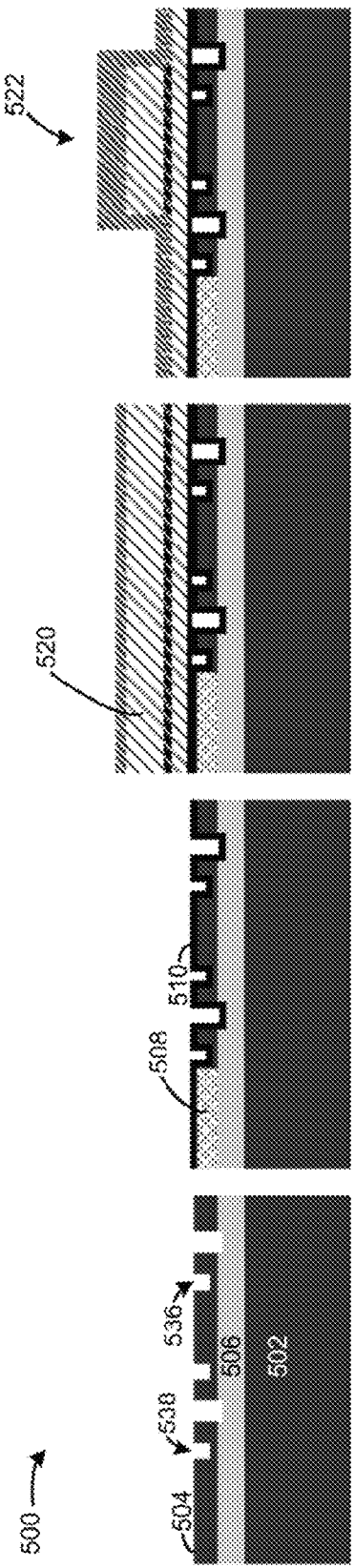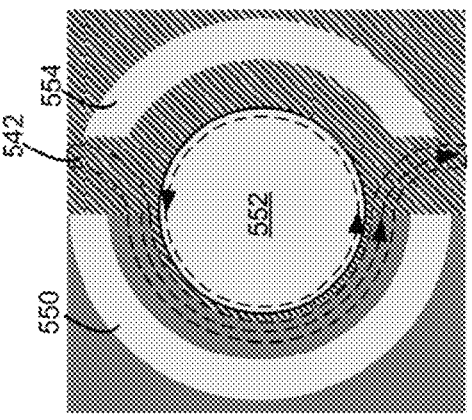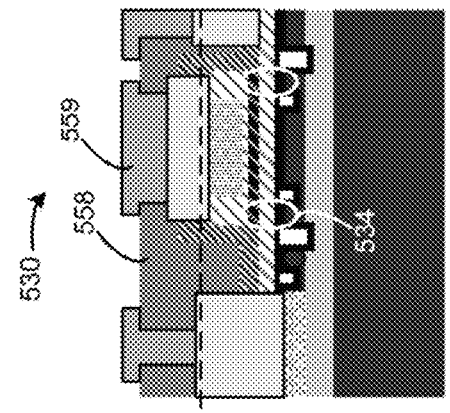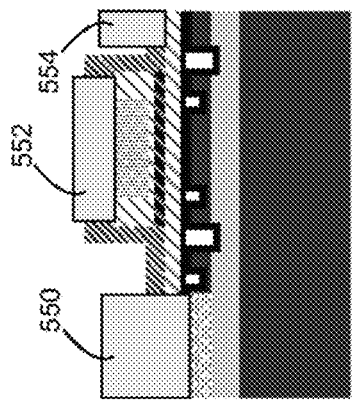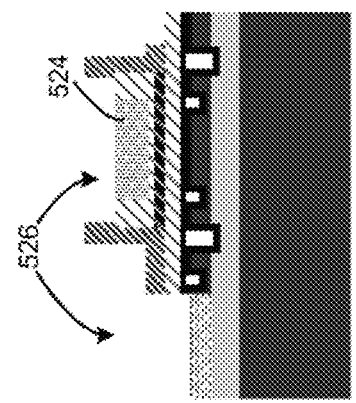

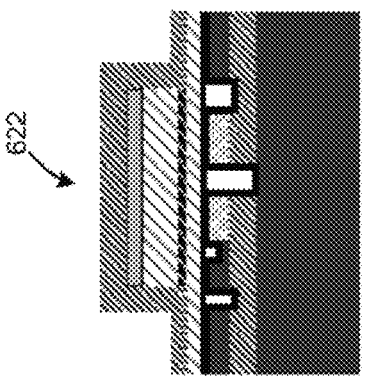 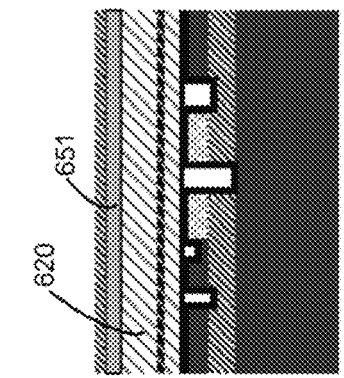 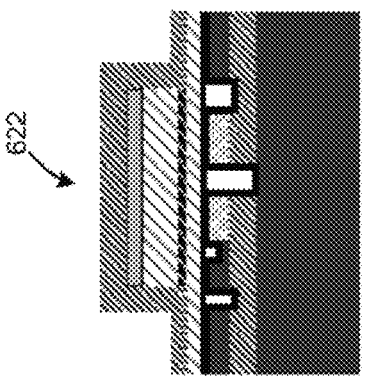 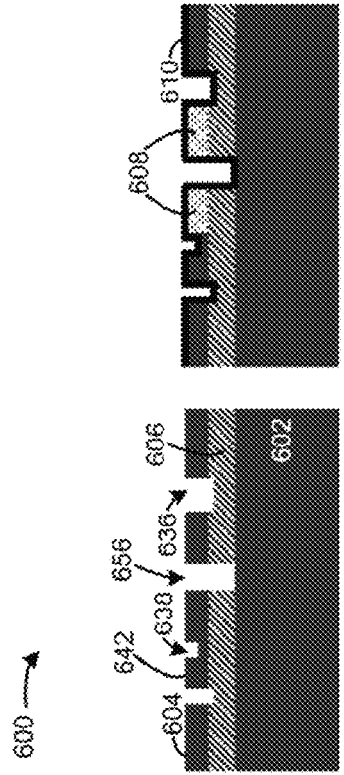 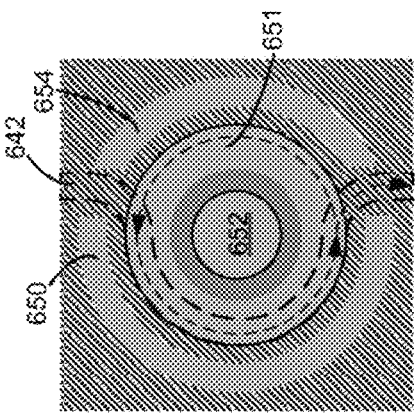 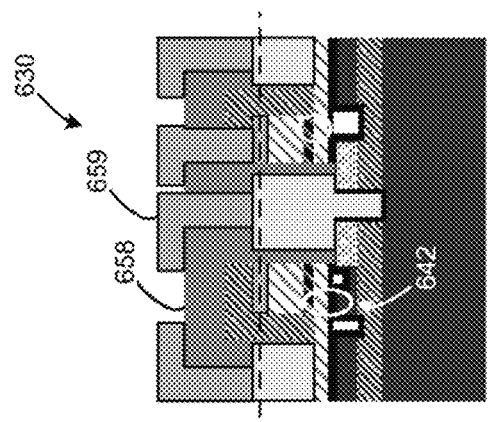 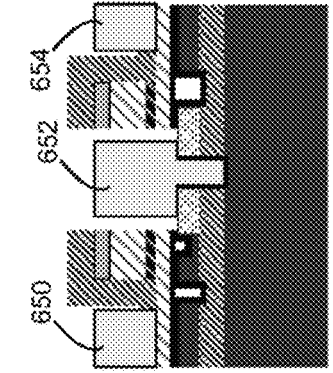 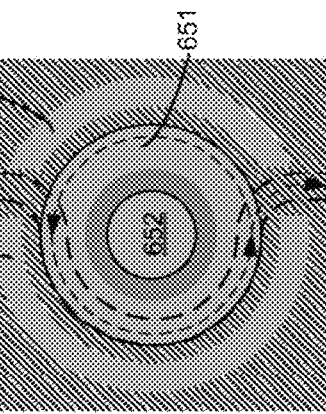

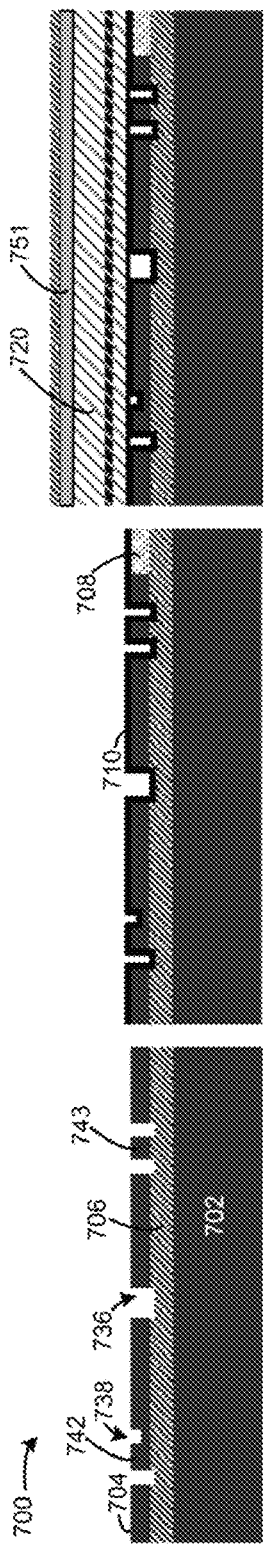
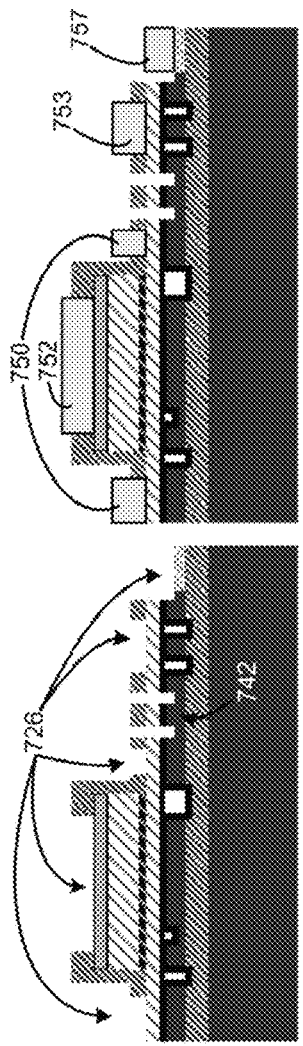
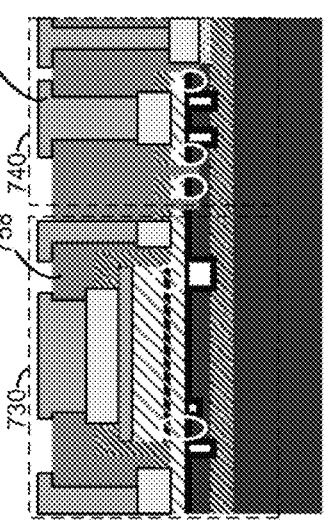
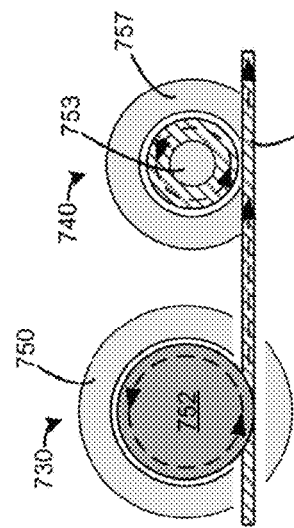
FIG. 7A  FIG. 7B  FIG. 7C
FIG. 7D  FIG. 7E  FIG. 7F
FIG. 7G  FIG. 7H

OPTICAL WAVEGUIDE RESONATORS

STATEMENT OF GOVERNMENT RIGHTS

This invention was made with Government support under Contract No. H98230-12-C-0236 awarded by the Maryland Procurement Office. The Government has certain rights in this invention.

BACKGROUND

Optical communications can involve light sources and switches, which can be complex and challenging to manufacture. Silicon-based semiconductor materials may not be ideal for optical communications. For example, silicon is associated with various limitations, such as limited efficiency of light generation and data modulation, due to silicon being an inefficient photon emission material associated with a slow carrier diffusion rate.

BRIEF DESCRIPTION OF THE DRAWINGS/FIGURES

FIGS. 3A-3H illustrate a method of forming a device including an optical waveguide resonator according to an example.

FIGS. 4A-4H illustrate a method of forming a device including an optical waveguide resonator according to an example.

FIGS. 5A-5H illustrate a method of forming a device including an optical waveguide resonator according to an example.

FIGS. 6A-6H illustrate a method of forming a device including an optical waveguide resonator according to an example.

FIGS. 7A-7H illustrate a method of forming a device including an optical waveguide resonator according to an example.

DETAILED DESCRIPTION

Examples provided herein describe devices and methods that may integrate a metal-oxide-semiconductor (MOS) capacitor structure inside a waveguide, to enable low-power consumption, high-speed loss phase modulation, and tuning, in hybrid devices such as lasers, modulators, integrated transmitters, or other devices that may be used alone or in combination as, e.g., optical (photonic) interconnects. In an example, a device may integrate a capacitor structure based on a direct-bandgap III-V compound semiconductor material layer, integrated with a silicon (Si) layer, to provide optical gain. Thus, the device may take advantage of the relatively strong plasma dispersion electro-optic effect provided by Si, as well as taking advantage of the advanced materials, designs, and fabrication techniques afforded by Si and the complementary metal-oxide-semiconductor (CMOS) wafer industry.

Example devices provide various advantages, based in part on a capacitor structure formed by sandwiching a dielectric layer between two dissimilar semiconductor layers (e.g., between a III-V compound semiconductor layer and a Si layer). The capacitor dielectric structure enables fast mechanics regarding carrier concentration variation (accumulation, depletion, and/or inversion) governed by the electrical field effect resulting in high speed modulation capability, in contrast to a slower carrier injection approach. Examples exhibit zero or very little leakage current through the capacitor dielectric layer, resulting in zero or very little power consumption at low-speed operation frequencies. There is flexibility in choice of materials, because the capacitor dielectric can be made of a different material (dielectric, polymer, etc.) and in a different method (oxidation, deposition, chemical reaction, etc.) compared to other device layers, providing flexibility for device processing and/or fabrication, while leveraging of material and process knowledge from the advanced CMOS industry. Materials, such as dissimilar first and second semiconductor layers, can be integrated using bonding, monolithic growth, or other methods. Such a process/fabrication approach may be used to make hybrid lasers, modulators, phase shifters, waveguide intensity attenuators or boosters, and other photonic components, resulting in efficiencies in manufacturing devices for optical communications.

Figure 1:
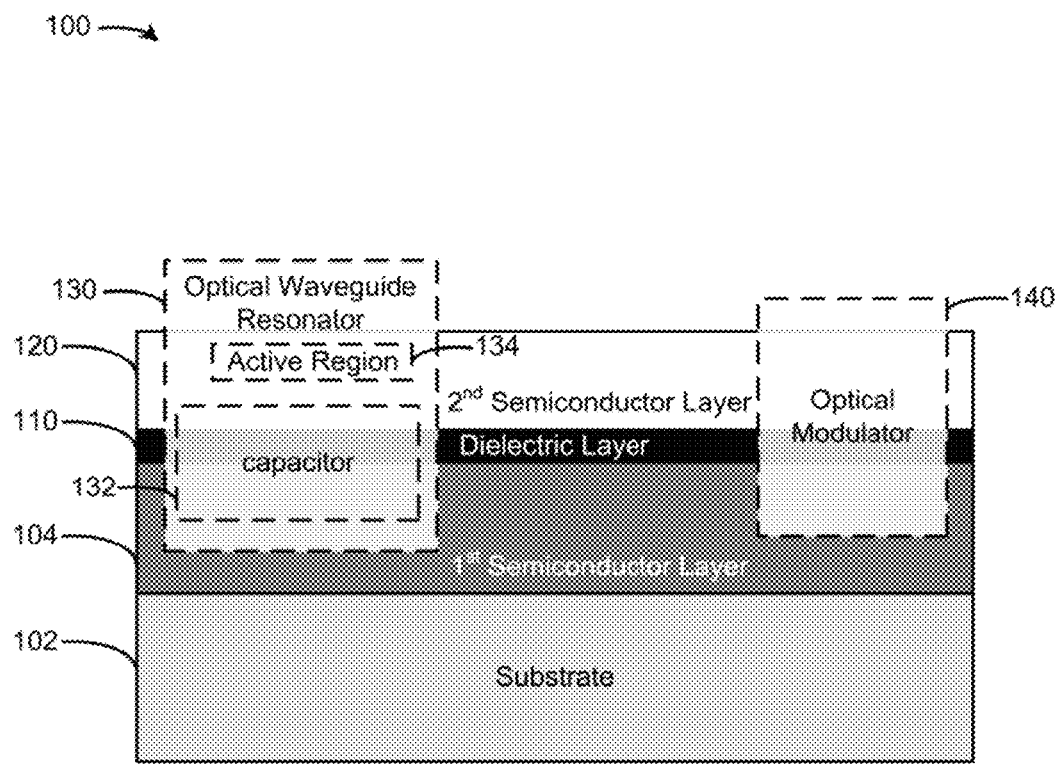
FIG. 1 is a block diagram of a device including an optical waveguide resonator according to an example.

FIG. 1 is a block diagram of a device 100 including an optical waveguide resonator 130 according to an example. The device 100 also includes substrate 102, first semiconductor layer 104, dielectric layer 110, second semiconductor layer 120, and optical modulator 140. The optical waveguide resonator 130 includes capacitor 132 and active region 134.

Device 100 illustrates a hybrid MOS photonic device, whereby two different semiconductor materials, first and second semiconductor layers 104, 120, sandwich a dielectric layer 110 to form a metal-oxide-semiconductor (MOS) capacitor structure 132, A voltage may be applied across the MOS capacitor structure 132, enabling electrical carriers to accumulate, deplete, or invert around the dielectric layer 110. An optical mode associated with the optical waveguide resonator 130 can overlap with the MOS capacitor structure 132, causing variation of modal index and modal loss of the optical waveguide resonator 130, along with a corresponding change of electrical carrier concentration, i.e., the change of applied voltage across the capacitor 132 (e.g., via electrodes/contacts, not shown in FIG. 1). The change of model index and loss in the optical waveguide resonator 130 may be used for data modulation, optical attenuation or boost (i.e., free carrier absorption reduction), phase shifting (i.e., wavelength tuning), and other optical communication applications.

The first semiconductor layer 104 may be silicon, and may include a buried oxide layer (BOX, not shown in FIG. 1). The first semiconductor layer 104 is disposed on a silicon substrate 102, thereby forming a silicon-on-insulator (SOI) substrate, or other semiconductor structure upon which to form the device 100.

The second semiconductor layer 120 may include various layers (e.g., comprising a compound semiconductor), such as layers of negatively doped indium phosphide (n-InP), positively doped indium phosphide (p-InP), or other semiconductor materials that may form an active region 134 caused by an interface between a negatively (n) and positively (p) doped semiconductor material.

The dielectric layer 110 may be an interface oxide, formed at the interface between the first semiconductor layer 104 and the second semiconductor layer 120. The dielectric layer 110 may be formed blankly across an entire surface, or may be applied locally at a targeted portion of the surface. Layers may be formed based on deposition, oxidation, or other formation techniques. The dielectric layer 110 is to be sandwiched between first and second semiconductor layers 104, 120. Accordingly, the dielectric layer 110 may be disposed on at east one of the first and second semiconductor layers 104, 120, and is not limited to being disposed on one or the other of the first and second dielectric layers 104, 120 (e.g., during fabrication).

The optical waveguide resonator 130 is a hybrid waveguide, which includes at least a portion of the first semiconductor layer 104, the dielectric layer 110, and the second semiconductor layer 120, respectively. The optical waveguide resonator 130 also includes an optical resonator active region 134, e.g., at an interface between sub-layers (not shown separately in FIG. 1) within the compound second semiconductor layer 120.

The capacitor 132 may be formed by the first semiconductor layer 104 (e.g., Si material), the dielectric layer 110, and a sub-layer (e.g., n-InP) of the second semiconductor layer 120. Thus, the capacitor 132 is a MOS capacitor, which may be used to quickly modulate a refractive index and loss of the optical waveguide resonator 130. Manipulating free carrier concentration of the waveguide enables corresponding change in the properties of the optical waveguide resonator 130 (e.g., applying an electric field across the capacitor 132 to either accumulate, deplete, or invert carriers). An optical mode of the optical waveguide resonator 130 (e.g., corresponding to active region 134) is to overlap with the MOS capacitor 132, enabling tuning of the phase and loss of the optical modes of the optical waveguide resonator 130, by changing an electric field of the capacitor 132.

The hybrid device platform of FIG. 1 illustrates a hybrid MOS resonator 130 and modulator 140. In an example including a MOS laser as the optical waveguide resonator 130, electrodes (not shown in FIG. 1) may be used to inject carriers into a laser active region 134 to generate photons in the active region 134, and form the optical mode that is to overlap with the dielectric layer 110.

The optical modulator 140 may be formed by at least a portion of the layers that also were used to form the optical waveguide resonator 130. In an example, the optical modulator 140 may omit or remove the upper layers that were used in the optical waveguide resonator 130 (i.e., that would have formed a laser active region 134), resulting in a hybrid modulator 140 formed from corresponding lower layers of at least a portion of the second semiconductor layer 120, the dielectric layer 110, and the first semiconductor layer 104. Applying an electric field (via electrodes, not shown in FIG. 1) to an optical mode of the optical modulator 140 causes a change of carrier concentration in the optical modulator 140, shifting resonance and becoming more or less optically lossy etc. In an example, a voltage may be applied through electrodes (not shown) to change carrier concentration around the dielectric layer 110 of the optical modulator 140, causing a subsequent change of modal index and loss to enable direct modulation of phase and loss, Similar phase and loss change can be realized in examples where an optical mode is launched into a hybrid waveguide. The capacitance of capacitor 132, provided to the device 100, may be limited based on physically constraining a location of the capacitor structure 132. Thus, capacitance may be located specifically to provide carrier concentration variation in the optical mode region of the optical waveguide resonator 130. For example, the MOS capacitor 132 may be formed only at the optical waveguide resonator 130, e.g., by etching an isolation trench through to at least a portion of the first semiconductor layer 104, to electrically isolate capacitive behavior to a portion of the optical waveguide resonator 130.

Fabrication of the optical waveguide resonator 130 (e.g., laser) and the optical modulator 140 may use the same set of sub-layer(s) (e.g., III-V layer(s)) of the second semiconductor layer 120 below the active region 134. For example, the optical modulator 140 may be formed based on the same techniques as the optical waveguide resonator 130 from the same layers, but also by selectively removing at least a portion thereof, e.g., removing a p-InP active region of the second semiconductor layer 120, Thus, fabrication of the hybrid device 100 is efficient and convenient, because it is possible to fabricate both the laser device (optical waveguide resonator 130) and the optical modulator 140 on the same chip, in very close proximity to each other on the substrate 102. Accordingly, the device 100 may be fabricated based on a small footprint chip area, conserving resources.

Figure 2:
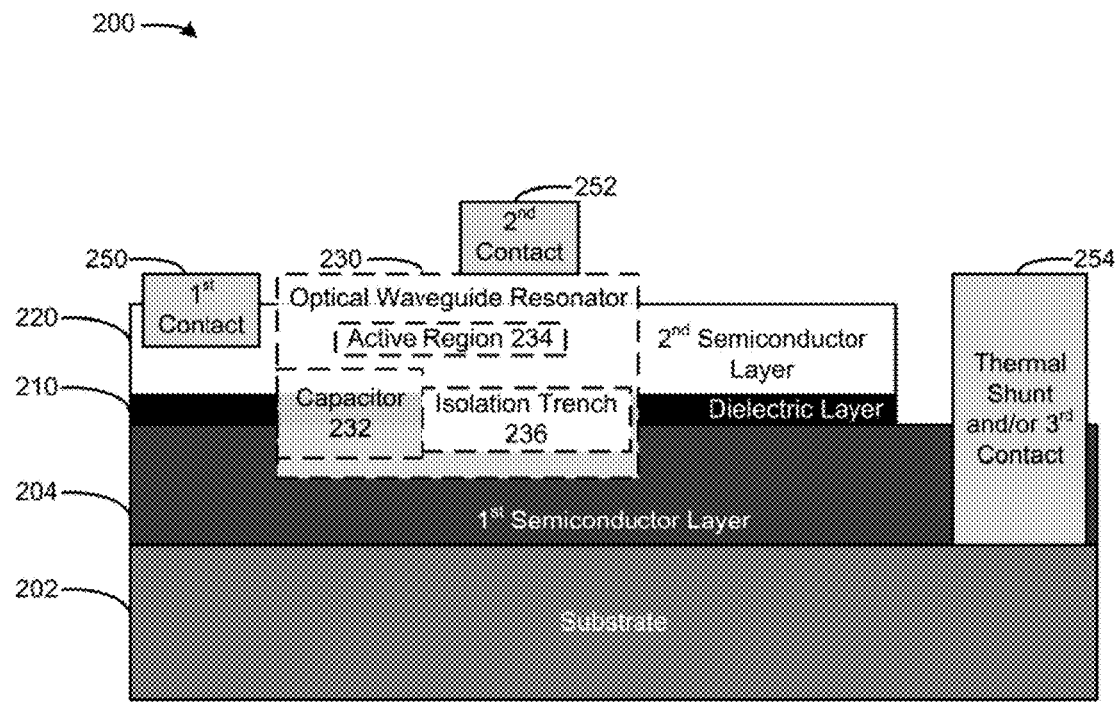
FIG. 2 is a block diagram of a device including an optical waveguide resonator according to an example.

FIG. 2 is a block diagram of a device 200 including an optical waveguide resonator 230 according to an example. The device 200 also includes substrate 202, first semiconductor layer 204, dielectric layer 210, second semiconductor layer 220, first contact 250, second contact 252, and thermal shunt and/or third contact 254. The optical waveguide resonator 230 includes capacitor 232, active region 234, and isolation trench 236.

Device 200 illustrates a three-terminal configuration, including a MOS structure (capacitor 232) in, e.g., a hybrid laser optical waveguide resonator 230. The first contact 250 and the second contact 252 may be used to introduce carriers (electrons, holes) to recombine at the active region 234, and emit photons (e.g., similar to the principle of operation of a diode laser). However, the first contact 250 and the third contact 254 may be used to apply an electric field across the hybrid MOS capacitor 232, to thereby modulate the lasing of the optical waveguide resonator 230.

The third contact 254 also may function as a thermal shunt, in addition to being an electrode (that may contact the substrate 202). The thermal shunt 254 is positioned to not come in contact with the second semiconductor layer 220 (e.g., the III-V sub-layers) to thereby provide electrical isolation. However, the thermal shunt 254 can conduct heat away from silicon device layers to the substrate 202 (e.g., based on conducting heat from the silicon device layers/ second semiconductor layer 220, through the first semiconductor layer 204, to the thermal shunt 254). Thus, in an example, heat from the III-V layers of the optical waveguide resonator 230 may be transferred by the thermal shunt 254 to the silicon substrate 202.

The isolation trench 236 provides electrical isolation for various components of device 200, e.g., by isolating an extent of the capacitor 232 forming a portion of device 200. Minimizing the resistance-capacitance (RC) of the optical waveguide resonator enables faster switching speeds. The capacitor 232 may be confined to the optical waveguide resonator 230 by the isolation trench 236. The isolation trench 236 thereby prevents an entire width of the first semiconductor layer 204 underneath the second semiconductor layer 220 from operating as a capacitor. The isolation trench 236 can cause the capacitor 232 to form only in the waveguide region, enabling better efficiency/switching speeds. The isolation trench 236 may electrically isolate two sections of the first semiconductor layer 204 from each other, whereby a first section forms at least a part of the capacitor 232, and the second portion is electrically isolated from changes in voltage/charge at the capacitor 232. The capacitor 232 is thereby positioned/isolated to efficiently affect the optical mode of the optical waveguide resonator 230.

FIGS. 3A-3H illustrate a method of forming a device 300 including an optical waveguide resonator 330 according to an example. Device 300 may be a hybrid MOS laser based on a standing-wave resonator structure. In FIG. 3A, substrate 302 includes a buried oxide layer 306 and a first semiconductor layer 304. Isolation trench 336, waveguide trench 338, and thermal shunt trench 356 are disposed in the first semiconductor layer 304. The trenches may be formed on a silicon-on-insulator (SOI) substrate, e.g., based on patterning/etching. As illustrated, etching may penetrate through the BOX layer 306 to the silicon substrate 302 (e.g., for the isolation trench 336). The isolation trench 336 thereby may electrically isolate the waveguide (to be formed later, using remaining silicon). A rightmost portion of the isolation trench 336 (the shallow portion) can provide optical confinement, and a leftmost portion penetrating down to the substrate layer 302 can provide electrical isolation. Thus, the isolation trench 336 may provide multiple types of benefits/isolation.

In FIG. 3B, the p+ region 308 and the dielectric layer 310 are disposed on the first semiconductor layer 304. The p+ Si region may be formed in the first semiconductor layer 304 based on ion implantation, whereby region(s) of the silicon of the first semiconductor layer 304 may be selectively exposed to ion implantation and/or doping. e.g., to prepare the silicon for receiving silicon metal contacts later. The capacitor dielectric layer 310 is shown formed on the top of first semiconductor layer 304. However, in alternate examples, the dielectric layer 310 may be formed on a bottom of the second semiconductor layer 320, either instead of, or in conjunction with, formation on top of the first semiconductor layer 304, to be sandwiched between the first and second semiconductor layers 304, 320. The dielectric layer 310 may be formed by oxidation (e.g., growing a layer of gate oxide), deposition, chemical reactions, or other techniques.

In FIG. 3C, second semiconductor layer 320 is disposed on the dielectric layer 310. The III-V layers may be integrated onto the Si of the first semiconductor layer 304, e.g., to sandwich the capacitor dielectric layer 310. The III-V layers of the second semiconductor layer 320 may be disposed on the Si of the first semiconductor layer 304 by wafer bonding, epitaxial growth, and/or other methods. A different dielectric layer also may be formed as the top of the second semiconductor layer 320, based on deposition or other techniques.

In FIG. 3D, the mesa region 322 of the second semiconductor layer 320 is formed. In an example, lithography and etch processes may be conducted to form the III-V mesa on top of the Si waveguide(s) underneath. The mesa region 322 may be subsequently modified to serve as different types of devices (e.g., a resonator).

In FIG. 3E, H+ regions 324 are disposed in the second semiconductor layer 320. A proton implantation step may be used to define carrier flow channels, e.g., based on selectively changing the resistance of certain III-V regions in the second semiconductor layer 320. Regions where protons are implanted will have higher resistance, such that applied current will avoid passing through the high-resistance region(s), and instead pass through the center/low resistance region. Accordingly, the H+ regions 324 are to confine carriers and provide a better overlap with the optical mode of the optical waveguide resonator to be formed from the mesa structure 322, to avoid carrier waste.

In FIG. 3F, contact windows 326 are formed in the second semiconductor layer 320. After disposing a passivation layer on the surface (e.g., via surface passivation), exposure of the III-V contact layer, the top P contact layer (second contact 352), the III-V N contact layers (first and third contacts 350, 354), and the silicon P contact layer (thermal shunt contact) may be achieved.

In FIG. 3G, first contact 350, second contact 352, third contact 354, and thermal shunt 355 are disposed in the second semiconductor layer 320, e.g., by metal deposition. The thermal shunt 355 metal may penetrate through the BOX layer 306 and contact the silicon substrate 302.

In FIG. 3H, encapsulation 358 and contact probe pads 359 are disposed on the second semiconductor layer 320. The contact probe pads 359 are formed to allow injecting carriers into the laser active region 334 for photon generation, through the first and second contacts 350, 352. Carrier concentration may be varied around the capacitor dielectric layer inside the waveguide 330 by applying a voltage across the thermal shunt contact 355 and the third contact 354. The resulting optical waveguide resonator 330 includes an active region 334.

The circle shown at reference numeral 334 is to indicate where an optical mode of the optical waveguide resonator 330 may overlap with the active region of the optical waveguide resonator 330. A portion of the dielectric layer 310 is also to overlap with the optical modes, as indicated by the thick black line being included within the circle. Thus, device 300 forms a hybrid MOS laser with a standing-wave resonator structure, e.g., a Fabry-Perot (FP) laser, distributed feedback (DFB) laser, distributed Bragg reflector (DBR) laser, and so on. However, the techniques/materials/structures etc. described above with reference to FIG. 3 may be applied to other examples throughout the present application, such as by forming layers, trenches, features, coatings, thermal shunts, waveguides, and other various features described herein and applied throughout the description and drawings.

FIGS. 4A-4H illustrate a method of forming a device 400 including an optical waveguide resonator 430 according to an example. The device 400 illustrates an example of a mirroring laser. In FIG. 4A, substrate 402 includes a buried oxide layer 406 and a first semiconductor layer 404. Isolation trenches 436 and thermal shunt trench 456 are disposed in the first semiconductor layer 404. The techniques described above, such as those regarding FIG. 3A may be applied here (as well as applying to, and/or from, other figures throughout), such as forming the shunts/trenches/vias by patterning/etching (including forming the thermal shunt trench through the BOX layer 406). In FIG. 4B, p+ region 408 and the dielectric layer 410 are similarly disposed on the first semiconductor layer 404. In FIG. 4C, second semiconductor layer 420 is disposed on the dielectric layer 410. The second semiconductor layer 420 includes a metal layer 451. The metal layer 451 may be formed by deposition, and covered by a dielectric deposition layer on top of the metal layer 451, to form at least a portion of the second semiconductor layer 420. In FIG. 4D, the mesa region 422 of the second semiconductor layer 420 is formed. For example, a hybrid ring resonator and bus waveguide may be formed through a self-aligned process, after integrating the second semiconductor III-V layers with the first semiconductor SCSI substrate layer. The self-aligned process may be used to pattern both the bus waveguide and the III-V disk, from a top of the dielectric mask metal 451 of the III-V second semiconductor layer 420, down to the silicon of the first semiconductor layer 404. The etching may be controlled to not penetrate through the silicon, to leave a shallow pad for driving carriers to the MOS interface. Surface passivation may be applied to the separately formed portions of the second semiconductor layer 420 (e.g., to a ring resonator and a bus waveguide).

In FIG. 4E, thermal shunt 455 is disposed on the first semiconductor layer 404. The thermal shunt 455 may serve as an electrical contact. In FIG. 4F, contact window 426 is formed in the second semiconductor layer 420. The bus waveguide 442 also may be etched. The etching opens an inner hole on the III-V disk mesa structure 422, to make room for a common contact (second contact 452) by exposing an underlying layer, while also forming the III-V ring resonator structure. In FIG. 4G, second contact 452 is disposed in the second semiconductor layer 420, shown separated from a contact region of metal layer 451, which may serve as a first contact. A common contact 452 is placed inside the etched inner hole on III-V disk mesa. Surface passivation may be applied. In FIG. 4H, encapsulation 458 and contact probe pads 459 are disposed on the second semiconductor layer 420. A bus waveguide 442 is formed, and the optical waveguide resonator 430 results, includes an active region 434.

Device 400 illustrates an example hybrid microring laser. The microring laser is to confine an optical mode tightly based on bending, in contrast to the structure of FIG. 3 whose III-V mesa width is comparatively larger than the silicon waveguide. However, similar techniques/structures as those shown in FIG. 3 may be used to fabricate a travelling-wave resonator structures/lasers, e.g., ring and disk resonator lasers, with appropriate adjustments. As shown in FIG. 4, a hybrid MOS laser with travelling-wave resonator structure is to modulate the laser resonator waveguide. Carriers injected from first and second contacts 451, 452 are to recombine in a laser active region 434 to emit photons, which are guided by the hybrid ring resonator. Some photons are coupled to the bus waveguide 442 to provide laser output. Applying voltage across thermal shunt contact 455 and second contact 452 causes changes in carrier concentration in the hybrid ring waveguide. This causes variation in its modal index and loss, and corresponding laser phase and loss modulation.

An in-plane coupling resonator/bus waveguide arrangement is illustrated in FIG. 4 (and FIG. 5), whereby the bus waveguide 442 is arranged in the same plane (i.e., horizontal) to the laser resonator 430. Device 400 may use a straight bus waveguide 442, and the coupling length between the ring resonator and bus waveguide may be relatively small to capture the refraction of the light in view of the straight bus waveguide 442. In alternate examples, a curved bus waveguide may be used to allow for a relatively larger separation/couple length.

FIGS. 5A-5H illustrate a method of forming a device 500 including an optical waveguide resonator 530 according to an example. Device 500 is an example hybrid MOS laser with a travelling-wave resonator structure to modulate a bus waveguide, using a curved bus waveguide 542. In FIG. 5A, substrate 502 includes a buried oxide layer 506 and a first semiconductor layer 504. The Si ring and bus waveguides may be patterned prior to the III-V-on-Si integration shown in FIG. 5C. Isolation trench 536 and waveguide trench 538 are disposed in the first semiconductor layer 504. In the example of FIG. 5, a thermal shunt is not specifically shown (but may be included optionally). In contrast to the deep penetration of a thermal shunt, the isolation trench 538 just stops at the BOX layer 506, and does not penetrate through it. In FIG. 5B, the p+ region 508 and the dielectric layer 510 are disposed on the first semiconductor layer 504. In FIG. 5C, second semiconductor layer 520 is disposed on the dielectric layer 510. A top of the second semiconductor layer 520 may receive a dielectric deposition. In FIG. 5D, the mesa region 522 of the second semiconductor layer 520 is formed. A top of the second semiconductor layer 520 may receive surface passivation.

In FIG. 5E, contact windows 526 are formed in the first and second semiconductor layers 504, 520. H+ regions 524 are disposed in the first and second semiconductor layers 504, 520. A proton process may be used to define a current channel in the III-V disk mesa 522. In contrast to the approach used in FIG. 4F where a hole was etched inside the III-V disk/mesa 422, proton implantation is used in FIG. 5E without a need to physically remove the center III-V. Rather, the proton implantation causes the center part to have a high electrical resistance, so the carriers will pass through the regions close to the edge of the mesa 522, to recombine and overlap with the optical mode 534. In FIG. 5F, first contact 550, second contact 552, and third contact 554 are disposed in the first and second semiconductor layers 504, 520. Common metal contact 554 is placed outside the laser mesa structure 522. The first contact 550 is shown touching the silicon 504, and the first and third contacts 550, 554 are to apply an electric field across the MOS region (i.e., capacitor formed by sandwiching the dielectric 510). In FIG. 5G, encapsulation 558 and contact probe pads 559 are disposed on the first and second semiconductor layers 504, 520. The resulting optical waveguide resonator 530 includes active region(s) 534. FIG. 5H illustrates a cross-sectional overhead view of device 500 taken along the dashed line extending across FIG. 5G, showing first contact 550, second contact 552, and third contact 554, along with curved bus waveguide 542.

Thus, FIG. 5 illustrates yet another process(es) to realize another travelling-wave resonator laser, for a hybrid MOS laser with a travelling-wave resonator structure to modulate the bus waveguide. In contrast to applying voltage to the hybrid laser resonator waveguide (as shown in FIG. 4), voltage is applied in FIG. 5 to the bus waveguide (through the first and third contacts 550, 554). By varying the bus waveguide modal index and loss as shown in FIG. 5, outcoupling of the laser signal from the laser to the bus waveguide is varied to realize laser output modulation.

A curved conformal bus waveguide 542 is shown as an example bus waveguide design. Compared to a straight bus waveguide, the curved conformal bus waveguide 542 has a longer interaction length (i.e., coupling length) with the resonator, for more efficient light capture and output power modulation. Additionally, the curved conformal bus waveguide 542 enables a relaxed tolerance for device positions, e.g., the separation distance (between the curved bus waveguide 542 and resonator) can be relatively larger. A portion of the bus waveguide 542 that is conformal with the resonator disk also is variable according to design choice. The conformal portion is not limited to the 180 degree sweep as shown in FIG. 5, and may sweep other angles such as 30 degrees, 40 degrees etc. (including angles of greater than or less than 180 degrees). FIG. 5 also illustrates an example of an in-plane coupling scheme, where the bus waveguide 542 is in the same plane (i.e., horizontal) as the laser resonator.

FIGS. 6A-6H illustrate a method of forming a device 600 including an optical waveguide resonator 630 according to an example. In FIG. 6A, substrate 602 includes a buried oxide layer 606 and a first semiconductor layer 604. Isolation trench 636, waveguide trench 638, bus waveguide 642, and thermal shunt trench 656 are disposed in the first semiconductor layer 604, In contrast to FIG. 5, instead of having a thermal shunt formed outside the resonator ring, device 600 includes a thermal shunt structure/contact 652 located inside the ring. Thus, the thermal shunt trench 656 etches a hole through the BOX layer 606 inside the ring. In FIG. 6B, p+ regions 608 and the dielectric layer 610 are disposed on the first semiconductor layer 604. In FIG. 6C, second semiconductor layer 620 is disposed on the dielectric layer 610, including metal layer 651. The metal layer 651 may be formed by deposition, and dielectric deposition may be applied on top of the metal layer 651. In FIG. 6D, the mesa region 622 of the second semiconductor layer 620 is formed. A top of the second semiconductor layer 620 may receive surface passivation.

In FIG. 6E, contact windows 626 are formed in the first and second semiconductor layers 604, 620. The p+ Si region may be exposed, and the III-V ring structure may be formed, based on etching a hole inside the III-V, to contiguously remove the III-V layer(s) of the second semiconductor layer 620. In FIG. 6F, first contact 650, second contact 652, and third contact 654 are disposed in the first and second semiconductor layers 604, 620. The second contact 652 contacts both the silicon device layer 604, and also the silicon substrate 602. Thus, the second contact 652 may serve two purposes: 1) a thermal shunt, and 2) a contact to apply an electric field between the III-V and the silicon layers. In FIG. 6G, encapsulation 658 and contact probe pads 659 are disposed on the first and second semiconductor layers 604, 620, resulting in the optical waveguide resonator 630. Bus waveguide 642 is also indicated, Two active regions are indicated by small circles in FIG. 6G, under the device 630 above the BOX 602. The active region to the right is contained in the III-V layers of the second semiconductor layer 620, and there is no silicon underneath due to an isolation trench 636 under that active region. The lack of silicon due to the isolation trench 636 enables most of the light of the corresponding active region to be confined to overlap with the active region, confined in the III-V layers of the second semiconductor layer 620. In contrast, the active region of the left circle is positioned above the bus waveguide 642 that is positioned under the overlying region of the III-V layers, resulting in more of a vertical coupling arrangement. Light from the active region on the left 'sees' the silicon waveguide 642 underneath it, coupling to that silicon waveguide 642, enabling extraction of the light out of that active region. FIG. 6H illustrates a cross-sectional overhead view of device 600 taken along the dashed line extending across FIG. 6G, showing first contact 650, second contact 652, metal layer contact 651, and third contact 654, along with curved bus waveguide 642 positioned in a vertical coupling arrangement.

Thus, FIG. 6 illustrates a hybrid MOS laser with travelling-wave resonator structure, and vertically coupling laser resonator and bus waveguide. The bus waveguide 642 can be above or underneath the laser resonator for vertical coupling. The common contact 650, 654 is still outside the laser resonator, as in the example of FIG. 5, but the p+ Si region 608 for the second contact 652 is inside the laser resonator. Voltage may be applied across the second contact 652 and the first/third contacts 650/654, to change modal index and loss of the bus waveguide and also the laser resonator, so a simultaneous phase and loss modulation may be realized.

The foregoing examples illustrate hybrid MOS lasers, and similar principles may be applied to a hybrid modulator, which may easily be integrated with lasers to form, e.g., a transmitter as shown in FIG. 7.

FIGS. 7A-7H illustrate a method of forming a device 700 including an optical waveguide resonator 730 according to an example. Device 700 can integrate the laser 730 and the modulator 740 together, including the MOS structure within them. The structures may use the same second semiconductor layer from the laser 730 to form the modulator 740, avoiding a need to bond another layer/piece to form both devices. In FIG. 7A, substrate 702 includes a buried oxide layer 706 and a first semiconductor layer 704. Isolation trench 736, waveguide trench 738, bus waveguide 742, and second bus waveguide 743 are disposed in the first semiconductor layer 704. In FIG. 78, p+ region 708 and the dielectric layer 710 are disposed on the first semiconductor layer 704. In FIG. 7C, second semiconductor layer 720 is disposed on the dielectric layer 710, including metal layer 751. The second semiconductor layer 720 may receive the metal layer 751 based on metal deposition, and may receive, on top of the metal layer 751, a layer of dielectric deposition.

In FIG. 7D, the mesa region 722 of the second semiconductor layer 720 is formed. In FIG. 7E, contact windows 726 are formed in the first and second semiconductor layers 704, 720. The modulator ring is also formed, to the right of the mesa region 722 of the laser modulator ring. Bus waveguide 742 for the optical modulator 740 is also shown, which may be formed based on etching an isolation trench between the laser and the modulator. In FIG. 7F, first contact 750, second contact 752, first modulator contact 753, and second modulator contact 757 are disposed in the first and second semiconductor layers 704, 720.

In FIG. 7O, encapsulation 758 and contact probe pads 759 are disposed on the first and second semiconductor layers 704, 720, resulting in the optical waveguide resonator 730 and optical modulator 740. FIG. 7H illustrates a cross-sectional overhead view of device 700 including the optical waveguide resonator 730 and optical modulator 740, showing first contact 750, second contact 752, first modulator contact 753, and second modulator contact 757, along with bus waveguide 742.

Thus, an integrated hybrid laser and travelling-wave resonator structure (similar to FIG. 6) and a hybrid MOS modulator with travelling-wave resonator structure are realized in device 700. Two bus waveguides are shown in the cross-sectional example of FIGS. 7A-7G, one for the laser 730 and one for the modulator 740. However, one bus waveguide may be used for both the laser 730 and the modulator 740, as shown in the top-view of FIG. 7H. A continuous-wave (cw) laser signal thus may be coupled out to the bus waveguide 742, and modulated by changing the modal index and loss of the hybrid MOS modulator 740.

Features of the various examples may be interchanged with each other. For example, the illustrated laser structure of device 700 may be replaced with any kind of laser structure, to share the bus waveguide 742 with the MOS modulator 740, because the modulator 740 is to modulate the signal. The laser may have its own MOS control electrode, which may optionally not be used for the modulation, and instead may be used to tune the laser to a resonance wavelength of the modulator 740. Many lasers may be integrated, along with many modulators, to form a multiple-channel transmitter, A laser-modulator pair may be integrated together to modulate a channel of the signal.

The various illustrated examples include a waveguide structure that can be formed before or after forming a dielectric layer between dissimilar first and second semiconductor material layers. Other features included in some examples, e.g., proton implantation to define carrier transportation paths, thermal shunt formation, etc., may be added or removed in various examples, without altering the MOS capacitor effects applied to the optical mode of the corresponding devices.

Figure 8:
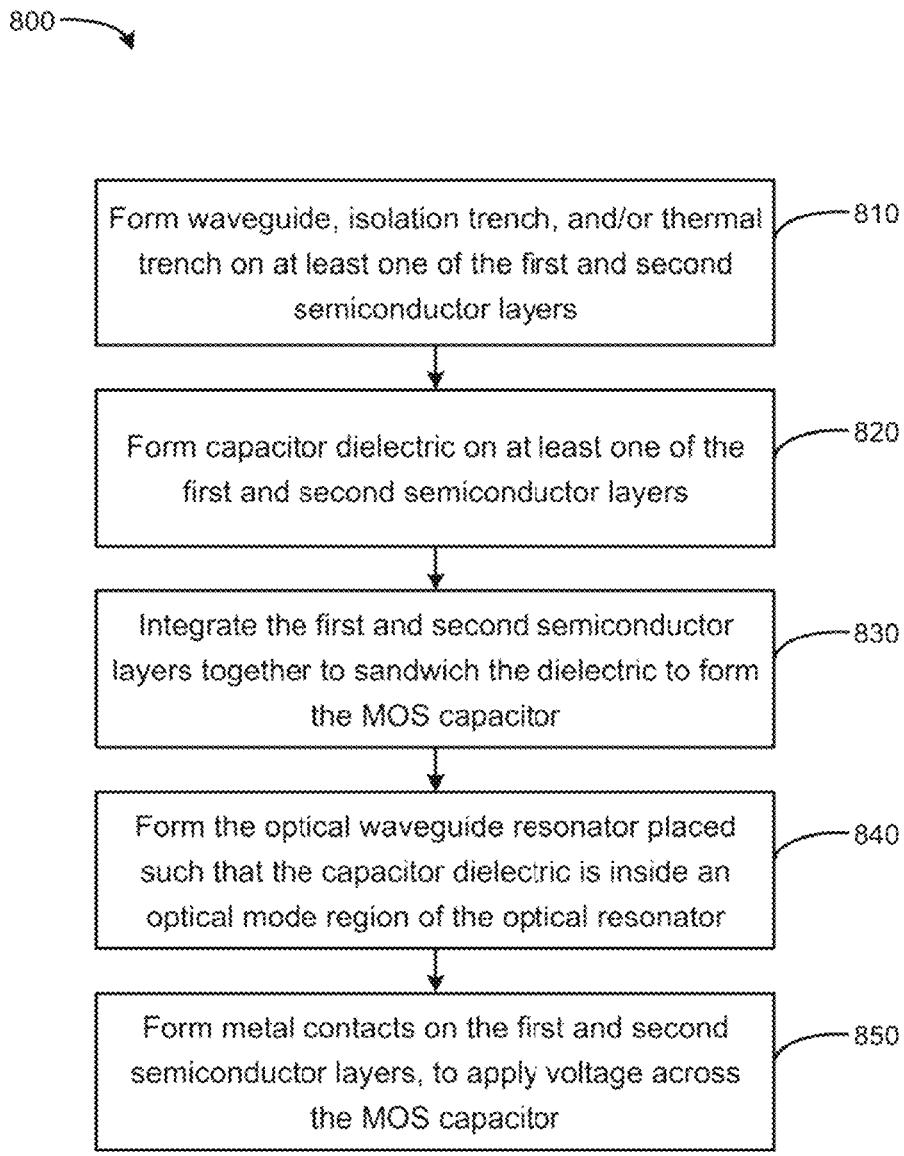
FIG. 8 is a flow chart based on forming an optical waveguide resonator according to an example.
Figure 9:
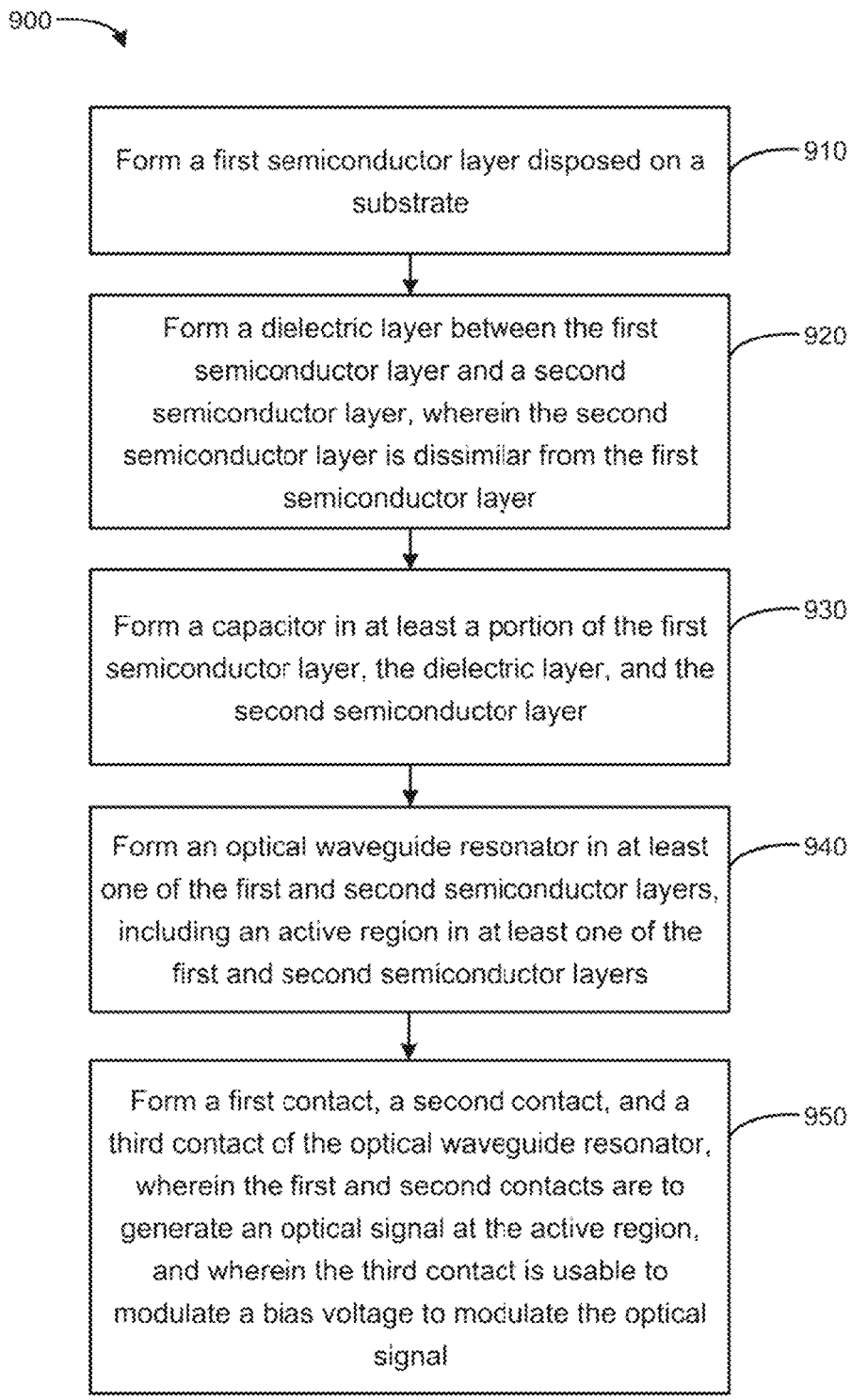
FIG. 9 is a flow chart based on forming an optical waveguide resonator according to an example.
Figure 10:
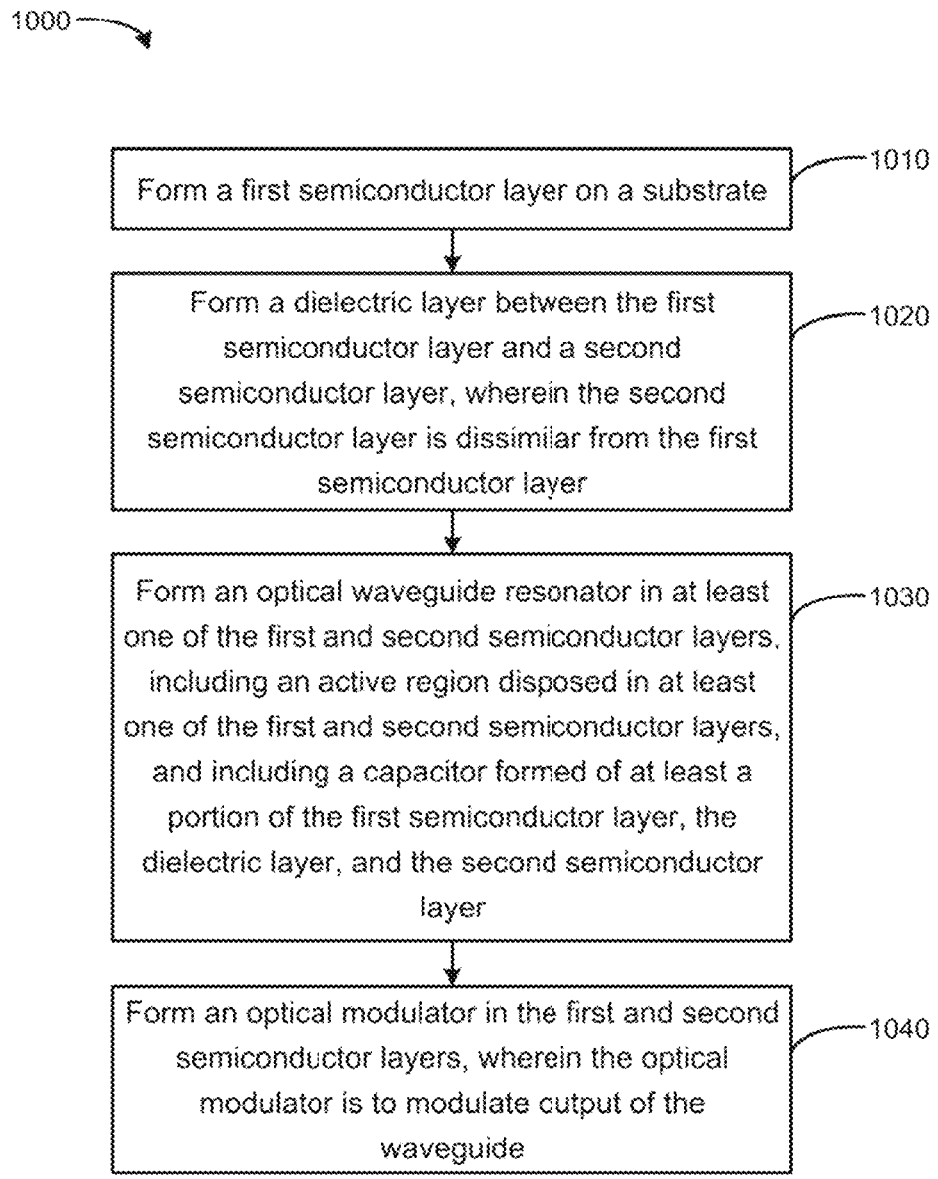
FIG. 10 is a flow chart based on forming an optical waveguide resonator according to an example.

Referring to FIGS. 8-10, flow diagrams are illustrated in accordance with various examples of the present disclosure. The flow diagrams represent processes that may be utilized in conjunction with various systems and devices as discussed with reference to the preceding figures. While illustrated in a particular order, the disclosure is not intended to be so limited. Rather, it is expressly contemplated that various processes may occur in different orders and/or simultaneously with other processes than those illustrated.

Generally, forming the various example devices described herein may be accomplished based on some common techniques. For example, techniques such as patterning the waveguide, patterning the isolation or thermal trench, forming the capacitor dielectric on one or both dissimilar materials of the first and second semiconductor layers, bonding these layers together, forming a MOS capacitor with a dielectric in between, forming a waveguide structure with a laser modulator such that the optical mode region overlaps with the capacitor region, forming contacts on the two semiconductor layers, and applying an electric field across the MOS capacitor structure to affect optical modes.

FIG. 8 is a flow chart 800 based on forming an optical waveguide resonator according to an example. In block 810, a waveguide, isolation trench, and/or thermal trench are formed on at least one of the first and second semiconductor layers. For example, a waveguide may be formed between etched trenches. In block 820, a capacitor dielectric is formed on at least one of the first and second semiconductor layers. For example, the dielectric may be formed on an underside of the second semiconductor layer that is to face the first semiconductor layer. In block 830, the first and second semiconductor layers are integrated together to sandwich the dielectric to form the MOS capacitor. For example, the layers are sandwiched together using wafer bonding. In block 840, the optical waveguide resonator is formed, placed such that the capacitor dielectric is inside an optical mode region of the optical resonator. For example, a mesa structure may be formed and a center portion may be etched away to create a ring structure. In block 850, metal contacts are formed on the first and second semiconductor layers, to apply voltage across the MOS capacitor. For example, the contacts may be formed into contact windows, based on metal deposition.

FIG. 9 is a flow chart 900 based on forming an optical waveguide resonator according to an example. In block 910, a first semiconductor layer is formed, disposed on a substrate. For example, the substrate may be a SOI including a silicon layer and a BOX layer. In block 920, a dielectric layer is formed between the first semiconductor layer and a second semiconductor layer. For example, the dielectric layer may be formed by oxidizing a portion of the first semiconductor layer, or a dielectric material may be deposited on top of the first semiconductor layer based on a dielectric deposition process. The second semiconductor layer is dissimilar from the first semiconductor layer. For example, a III-V semiconductor material second layer may be wafer bonded with the silicon first semiconductor layer, to sandwich the dielectric layer between the first and second layers. In an alternate example, the dielectric may be formed on at least one of the first or second semiconductor layers, prior to being sandwiched between them. In block 930, a capacitor is formed in at least a portion of the first semiconductor layer, the dielectric layer, and the second semiconductor layer. For example, sandwiching the dielectric with dissimilar semiconductors creates a capacitor structure, which may be electrically isolated using an isolation trench. In block 940, an optical waveguide resonator is formed in at least one of the first and second semiconductor layers, including an active region in at least one of the first and second semiconductor layers. For example, the optical waveguide resonator may include the capacitor that is electrically confined within the optical waveguide resonator based on an isolation trench. In block 950, a first contact, a second contact, and a third contact of the optical waveguide resonator are formed, wherein the first and second contacts are usable to generate an optical signal at the active region, and wherein the third contact is usable to modulate a bias voltage to modulate the optical signal. For example, the first, second, and third contacts may be formed by etching contact windows, and filling the windows based on metal deposition. A contact also may function as a thermal shunt.

FIG. 10 is a flow chart 1000 based on forming an optical waveguide resonator according to an example. In block 1010, a first semiconductor layer is formed on a substrate. For example, the substrate may be a SOI that isolates the first semiconductor layer from the remainder of the substrate based on a BOX layer. In block 1020, a dielectric layer is formed between the first semiconductor layer, and a second semiconductor layer, wherein the second semiconductor layer is dissimilar from the first semiconductor layer. For example, the first and second semiconductor layers are to sandwich the dielectric layer, which may be formed on the first and/or second semiconductor layer(s) based on dielectric deposition. In block 1030, an optical waveguide resonator is formed in at least one of the first and second semiconductor layers, including an active region disposed in at least one of the first and second semiconductor layers, and including a capacitor formed of at least a portion of the first semiconductor layer, the dielectric layer, and the second semiconductor layer. For example, portions of the first and/or second semiconductor layers may be etched or subjected to ion implantation to form the various structural elements of the optical waveguide resonator, having a corresponding arrangement relative to the various features described above. In block 1040, an optical modulator is formed in the first and second semiconductor layers, wherein the optical modulator is to modulate output of the waveguide. For example, the optical modulator may be formed from a subset of the layers used in the optical waveguide resonator, thereby providing enhanced efficiency of manufacture and reduced device area footprint, by enabling the same layer(s) to be used to form both the optical waveguide resonator and optical modulator.

What is claimed is:

1. A device comprising:
a first semiconductor layer disposed on a substrate;
a dielectric layer disposed on the first semiconductor layer;
a second semiconductor layer disposed on the dielectric layer, wherein the second semiconductor layer is dissimilar from the first semiconductor layer;
an optical waveguide resonator disposed in at least one of the first and second semiconductor layers, the optical waveguide resonator including:
an active region disposed in at least one of the first and second semiconductor layers; and
a capacitor disposed in the optical waveguide resonator and formed of at least a portion of the first semiconductor layer, the dielectric layer, and the second semiconductor layer; and an optical modulator disposed in the first and second semiconductor layers,
  wherein the optical modulator is spaced apart from the optical waveguide resonator and is to modulate an output of the optical waveguide resonator.

2. The device of claim 1, further comprising an isolation trench disposed in at least one of the first and second semiconductor layers, to electrically isolate the capacitor from a corresponding one of the first and second semiconductor layers, in which layer an optical signal of the optical waveguide resonator does not exist.

3. The device of claim 1, wherein at least one of the optical waveguide resonator and the optical modulator is to be optically coupled to an output waveguide.

4. The device of claim 1, wherein at least one of i) the optical waveguide resonator and ii) the optical modulator comprises a ring resonator.

5. The device of claim 1, wherein the optical waveguide resonator and the optical modulator are formed of a same set of 111-V semiconductors of the second semiconductor layer, wherein the optical waveguide resonator and the optical modulator share a similar 111-V layer structure below the active region of the optical waveguide resonator.

6. A method, comprising:
  forming a dielectric layer between a first semiconductor layer disposed on a substrate and a second semiconductor layer, wherein the second semiconductor layer is dissimilar from the first semiconductor layer;
  forming a capacitor in at least a portion of the first semiconductor layer, the dielectric layer, and the second semiconductor layer;
  forming an optical waveguide resonator in at least one of the first and second semiconductor layers, including an active region in at least one of the first and second semiconductor layers, wherein the capacitor is formed in the optical waveguide resonator; and
  forming a first contact, a second contact, and a third contact of the optical waveguide resonator, wherein the first and second contacts are to generate an optical signal at the active region, and wherein the third contact is usable to modulate a bias voltage to modulate the optical signal.

7. The method of claim 6, wherein at least one of the first, second, and third contacts comprises a thermal shunt disposed in a thermal trench, wherein the thermal shunt serves as an electrode in contact with the first semiconductor layer, and wherein the thermal shunt is not in contact with the second semiconductor layer.

8. The method of claim 6, further comprising forming a doped region of the first semiconductor layer prior to forming the dielectric layer, wherein the doped region is to correspond to the third contact.

9. The method of claim 6, further comprising forming a thermal trench prior to forming the dielectric layer, and forming a thermal shunt in the thermal trench.

10. A method, comprising:
  forming a first semiconductor layer on a substrate;
  forming a dielectric layer between the first semiconductor layer and a second semiconductor layer, wherein the second semiconductor layer is dissimilar from the first semiconductor layer;
  forming an optical waveguide resonator in at least one of the first and second semiconductor layers, including an active region disposed in at least one of the first and second semiconductor layers, and including a capacitor disposed inside the optical waveguide resonator and formed of at least a portion of the first semiconductor layer, the dielectric layer, and the second semiconductor layer; and
  forming an optical modulator in the first and second semiconductor layers, wherein the optical modulator is spaced apart from the optical waveguide resonator and is to modulate an output of the optical waveguide resonator.

11. The method of claim 10, further comprising forming an output waveguide to be optically coupled to at least one of the optical waveguide resonator and the optical modulator.

12. The method of claim 10, further comprising forming the optical waveguide resonator and the optical modulator based on a same set of III-V semiconductors of the second semiconductor layer, wherein the optical waveguide resonator and the optical modulator share a similar III-V layer structure below the active region of the optical waveguide resonator.

13. The method of claim 10, wherein the second semiconductor layer is comprised of a III-V compound semiconductor material, and wherein forming the second semiconductor layer comprises wafer bonding the second semiconductor layer to the dielectric layer.

14. The method of claim 10, further comprising forming a doped region of the first semiconductor layer prior to forming the dielectric layer.

15. The method of claim 10, further comprising forming a thermal trench prior to forming the dielectric layer, and forming a thermal shunt in the thermal trench.

* * * * *